(12) United States Patent
Negoro et al.

(10) Patent No.: US 8,975,939 B2
(45) Date of Patent: Mar. 10, 2015

(54) VOLTAGE CLAMP CIRCUIT AND INTEGRATED CIRCUIT INCORPORATING SAME

(75) Inventors: Takaaki Negoro, Kishiwada (JP); Shinichi Kubota, Minoo (JP); Koichi Morino, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/170,344

(22) Filed: Jun. 28, 2011

(65) Prior Publication Data

US 2012/0013383 A1 Jan. 19, 2012

(30) Foreign Application Priority Data

Jul. 16, 2010 (JP) ................................. 2010-161483

(51) Int. Cl.
*H03L 5/00* (2006.01)
*H02H 9/04* (2006.01)

(52) U.S. Cl.
CPC ...................................... *H02H 9/04* (2013.01)
USPC ......................................... 327/321; 327/306

(58) Field of Classification Search
USPC ................................................ 327/306–333
See application file for complete search history.

(56) References Cited

U.S. PATENT DOCUMENTS

| | | | | |
|---|---|---|---|---|
| 4,853,561 A | * | 8/1989 | Gravrok | 326/25 |
| 4,874,967 A | * | 10/1989 | Deane | 327/321 |
| 5,097,303 A | * | 3/1992 | Taguchi | 365/149 |
| 5,751,525 A | * | 5/1998 | Olney | 361/56 |
| 6,204,724 B1 | * | 3/2001 | Kobatake | 327/541 |
| 6,344,771 B1 | * | 2/2002 | Tobita | 327/544 |
| 6,433,609 B1 | * | 8/2002 | Voldman | 327/313 |
| 6,442,079 B2 | * | 8/2002 | Lee et al. | 365/189.09 |
| 6,933,764 B2 | * | 8/2005 | Devin | 327/309 |
| 7,071,514 B1 | * | 7/2006 | Ozard | 257/355 |
| 7,394,307 B2 | | 7/2008 | Negoro et al. | |
| 7,474,145 B2 | | 1/2009 | Negoro | |
| 7,646,242 B2 | | 1/2010 | Negoro | |
| 7,719,242 B2 | | 5/2010 | Negoro | |
| 7,728,566 B2 | | 6/2010 | Negoro et al. | |
| 7,755,337 B2 | | 7/2010 | Negoro | |
| 2006/0152284 A1 | | 7/2006 | Morino | |
| 2007/0242403 A1 | * | 10/2007 | Suetake | 361/91.1 |

FOREIGN PATENT DOCUMENTS

| | | |
|---|---|---|
| JP | 2001-86641 | 3/2001 |
| JP | 2002-270781 | 9/2002 |
| JP | 2005-25596 | 1/2005 |
| JP | 2005-109364 | 4/2005 |

(Continued)

OTHER PUBLICATIONS

Chinese official action dated Aug. 1, 2013 in corresponding Chinese patent application No. 201110200200.8.

(Continued)

*Primary Examiner* — Dinh Le
(74) *Attorney, Agent, or Firm* — Cooper & Dunham LLP

(57) ABSTRACT

A voltage clamp circuit includes a power supply, a first element connected with the power supply to output a constant current, a third element configured to allow a current to pass through when a voltage of a predetermined value or more is applied; and a second element configured to output a voltage according to a voltage generated by the first and third elements.

9 Claims, 5 Drawing Sheets

(56) References Cited

FOREIGN PATENT DOCUMENTS

| JP | 2006-178702 | 7/2006 |
|----|-------------|--------|
| JP | 2007-213270 | 8/2007 |
| JP | 2007-226710 | 9/2007 |
| JP | 2007-288882 | 11/2007 |
| JP | 2008-21166  | 1/2008 |
| JP | 2008-112251 | 5/2008 |
| JP | 2009-37303  | 2/2009 |

OTHER PUBLICATIONS

Japanese official action dated Apr. 8, 2014 in corresponding Japanese patent application No. 2010-161483.

* cited by examiner

VOLTAGE CLAMP CIRCUIT AND INTEGRATED CIRCUIT INCORPORATING SAME

CROSS REFERENCE TO RELATED APPLICATION

The present application is based on and claims priority from Japanese Patent Application No. 2010-161483, filed on Jul. 16, 2010, the disclosure of which is hereby incorporated by reference in its entirety.

BACKGROUND OF THE INVENTION

1. Field of the Invention

The present invention relates to a voltage clamp circuit which controls an input voltage and clamps an output voltage and an integrated circuit incorporating this voltage clamp circuit.

2. Description of the Prior Art

In prior art there is a known clamp circuit comprising protective diodes and MOS transistors to control an input voltage and be prevented from erroneously operating when a large input voltage over a certain defined magnitude is applied.

For example, Japanese Patent Application Publication No. 2001-86641 discloses such a clamp circuit which comprises an input terminal to which a voltage is input, a first protective diode reversely connected between the input terminal and a first power supply terminal to which a first power supply voltage Vdd is input, a second protective diode reversely connected between the input terminal and a second power supply terminal to which a ground potential GND is input, and an MOS transistor connected between the first and second power supply terminals.

Even applied with a voltage higher than the first power supply voltage Vdd to the input terminal, this clamp circuit can be prevented from erroneously operating until the voltage exceeds a value to turn on (break down) the first protective diode, by turning on the MOS transistor to connect the input terminal and the second power supply terminal and to clamp the input voltage to about a value of the first power supply voltage Vdd.

Aiming to prevent erroneous operation when an excessive input voltage is applied, such a clamp circuit controls an output voltage in accordance with an input voltage and outputs only a voltage of a preset value from an output terminal in accordance with an applied voltage of a preset value.

However, a problem arises with such a clamp circuit when connected with devices operating by an output voltage of the circuit as a power supply since levels of voltage such devices require to operate differ. There may be a case where devices cannot normally operate by the preset output voltage of the clamp circuit.

In particular, when connected with a supply voltage supervisor IC which operates at a very low voltage, the clamp circuit is required to output a very low voltage other than the preset voltage.

Meanwhile, the input voltage also functions as a power supply to various devices but it is not always adapted to a device in connection. With an input voltage being a preset value or more, the clamp circuit may output a voltage of a value exceeding a tolerance of the device, causing the device to fail to operate.

SUMMARY OF THE INVENTION

The present invention aims to provide a voltage clamp circuit that can output a voltage of an arbitrary value necessary to operate a device in connection, and output a voltage to normally operate the device even when an input voltage of a predetermined value or more is applied. It also aims to provide an integrated circuit incorporating such a voltage clamp circuit.

According to one aspect of the present invention, a voltage clamp circuit comprises a power supply, a first element connected with the power supply to output a constant current, a third element configured to allow a current to pass through when a voltage of a predetermined value or more is applied, and a second element configured to output a voltage according to a voltage generated by the first and third elements.

BRIEF DESCRIPTION OF THE DRAWINGS

Features, embodiments, and advantages of the present invention will become apparent from the following detailed description with reference to the accompanying drawings.

DETAILED DESCRIPTION OF THE PREFERRED EMBODIMENT

Hereinafter, a voltage clamp circuit according to embodiments of the present invention will be described in detail with reference to the accompanying drawings.

First Embodiment

Figure 1:
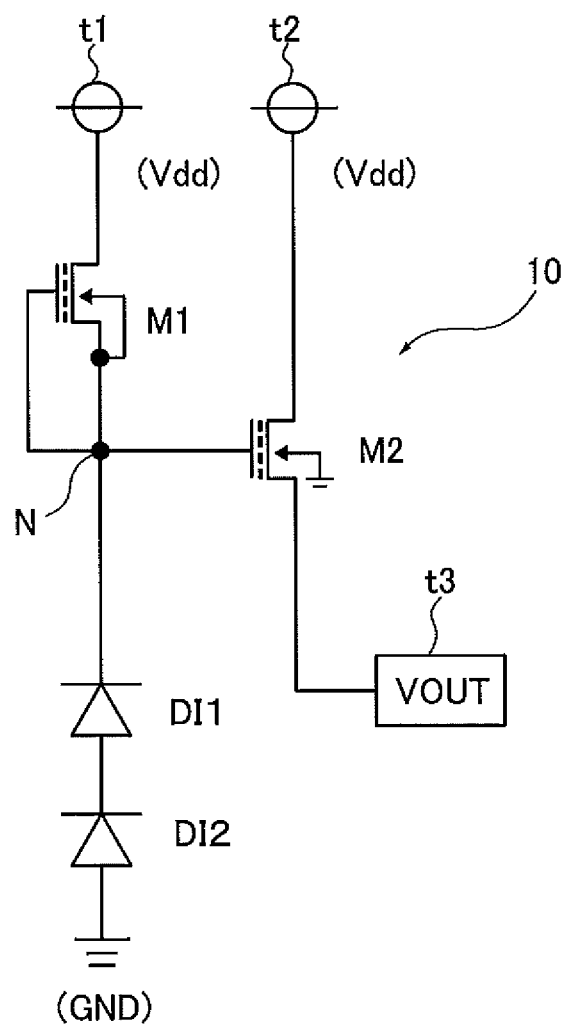
FIG. 1 shows a voltage clamp circuit according to a first embodiment of the present invention.
Figure 2:
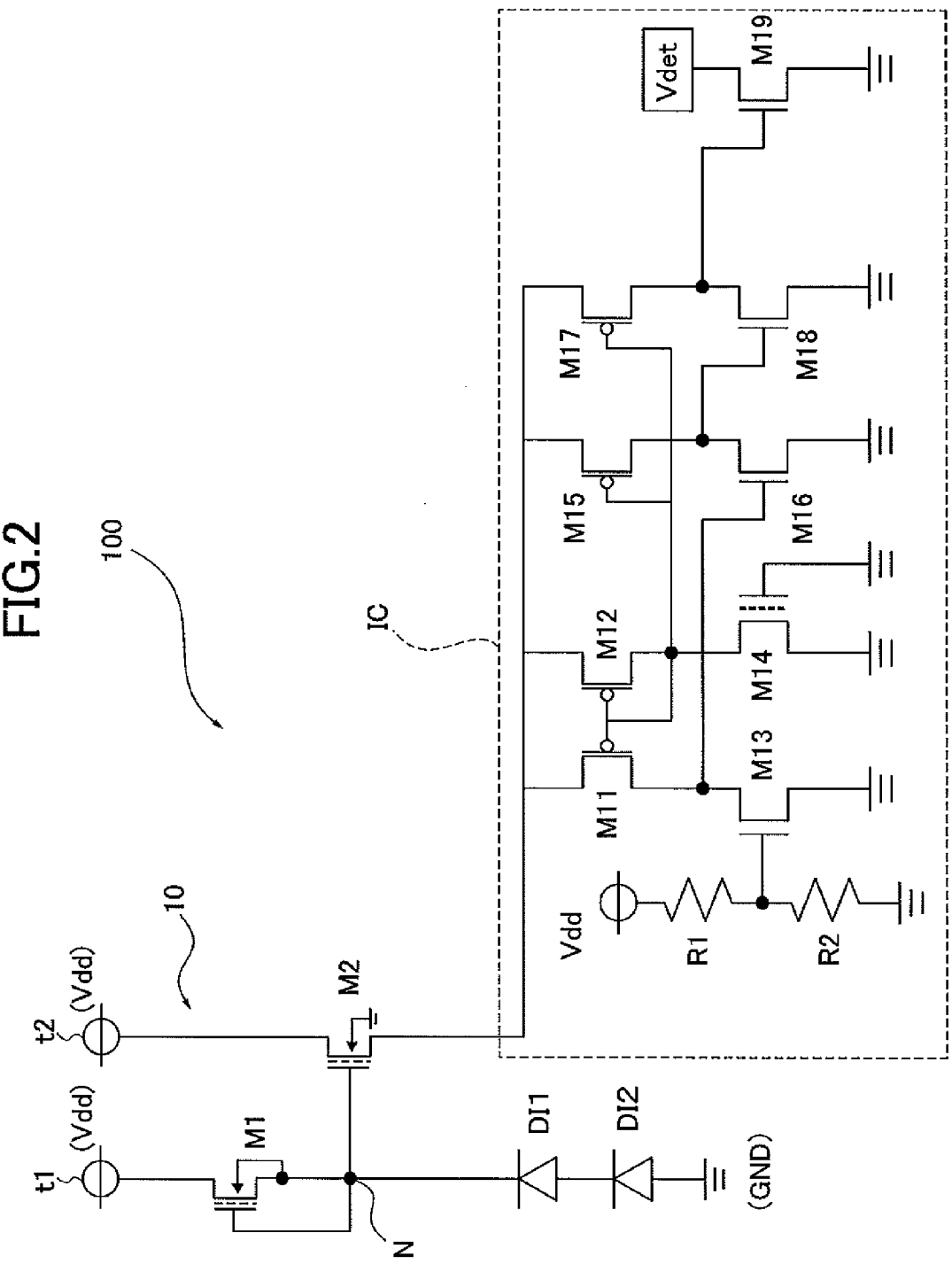
FIG. 2 shows an integrated circuit incorporating the voltage clamp circuit in FIG. 1.

FIG. 1 shows a voltage clamp circuit 10 according to a first embodiment of the present invention and FIG. 2 shows an integrated circuit 100 incorporating the voltage clamp circuit in FIG. 1.

In FIG. 1 the voltage clamp circuit 10 according to the first embodiment comprises power supply terminals t1, t2 applied with a power supply voltage Vdd, a MOS transistor M1 as a first element connected with the power supply terminal t1, a second MOS transistor M2 as a second element connected with the power supply terminal t2, an output terminal t3 connected with the second MOS transistor M2, and a first diode DI1 and a second diode DI2 as a third element provided downstream of the MOS transistor M1 and connected to a gate of the second MOS transistor M2.

The first MOS transistor M1 is an n-channel, depletion type transistor and connected with the power supply terminal t1 at a drain. Gate and source thereof are connected to form a constant current source.

The second MOS transistor M2 is also an n-channel, depletion type transistor and connected with the power supply terminal t2 at a drain. A gate thereof is connected with an intermediate node N at downstream of the first MOS transistor M1 while a source thereof is connected with the output terminal t3. The diffusion potential (voltage of channel diffusion) of the gate of the second MOS transistor M2 is set to be in GND level.

The first diode DI1 and the second diode DI2 are connected in series and an anode thereof is grounded and a cathode thereof is connected to the intermediate node N. A breakdown voltage BV1 of the first diode DI1 and that BV2 of the second diode DI2 are set to the same value (BV1=BV2=10V).

The first and second diodes DI1, DI2 are configured to allow a current to pass through a ground terminal (GND) when the power supply voltage Vdd equal to or over a sum (20V) of the breakdown voltages BV1, BV2 is supplied to the power supply terminal t1.

Moreover, the first and second MOS transistors M1, M2 and the first and second diodes DI1, DI2 are arranged on an SOI substrate to be completely separated from each other using an oxide film (insulator). They can be separated by trench isolation or using an LOCOS oxide film or else.

In FIG. 2 the integrated circuit 100 comprises the voltage clamp circuit 10 and a supply voltage supervisor (device) IC connected with the output terminal t3.

The supply voltage supervisor IC comprises MOS transistors M11 to M19 and voltage dividing resistances R1, R2 and operates using the output voltage Vout of the voltage clamp circuit 10 as a power supply.

Next, the operation of the voltage clamp circuit 10 is described.

Figure 3:
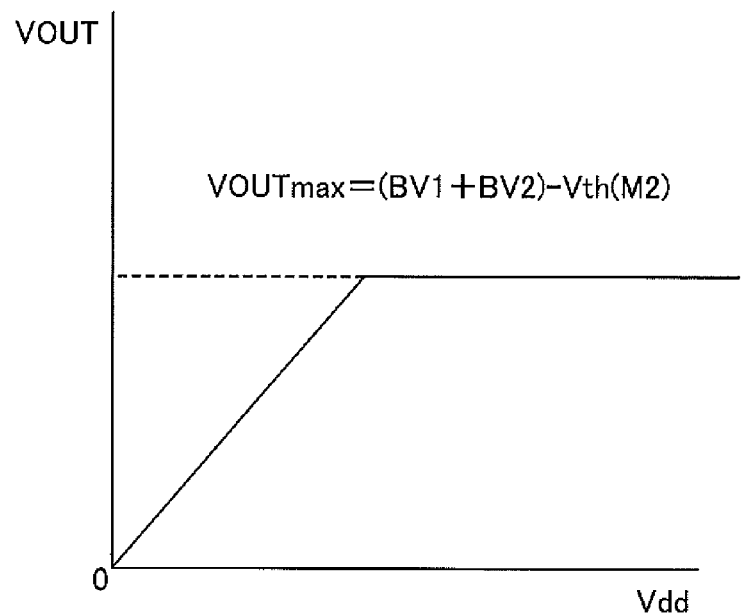
FIG. 3 is a graph showing a relation between a power supply voltage and an output voltage of the voltage clamp circuit in FIG. 1.

FIG. 3 is a graph showing a relation between the power supply voltage Vdd and the output voltage Vout of the voltage clamp circuit 10 in FIG. 1.

While the power supply voltage Vdd is less than the predetermined value (20V), no current flows through the first and second diodes DI1, DI2 and the power supply voltage is outputted to the intermediate node N connected with the first MOS transistor M1 and the first diode DI1 without a change.

The second MOS transistor M2 is a source follower type in a size to sufficiently flow a load current so that an overdrive voltage value $(=(2\times I/\beta)^{1/2}$ where I is load current and $\beta=W/L\times Cox\times\mu)$ is to be sufficiently small and a voltage lower than the gate potential by a threshold is output to the source. Accordingly, the output voltage thereof increases as the power supply voltage increases. Also, the second MOS transistor M2 is an n-channel, depletion type transistor, therefore, it is able to flow a current even with the gate potential being 0V.

Thus, as shown in FIG. 3, while the power supply voltage Vdd is the predetermined value (20V) or less, the output voltage Vout from the output terminal t2 linearly increases along with an increase in the power supply voltage Vdd. Accordingly, the voltage clamp circuit 10 can output a voltage of an arbitrary value needed to operate the supply voltage supervisor IC.

Meanwhile, when the power supply voltage Vdd exceeds the predetermined value (20V), the first and second diodes DI1, DI2 turn on (break down) to allow a current pass through the ground terminal GND.

Then, a voltage of the intermediate node N is fixed and so is the gate potential of the second MOS transistor M2.

As shown in FIG. 3, once the power supply voltage Vdd exceeds the predetermined value, the output voltage Vout of the second MOS transistor MOS transistor M2 is constant irrespective of an increase in the power supply voltage Vdd.

The output voltage Vout takes a value lower than the sum (20V) of the breakdown voltages BV1, BV2 by a threshold voltage Vth (M2) of the second MOS transistor M2 (BV1+BV2−Vth (M2)).

However, since the second MOS transistor M2 is also a depletion type, the threshold voltage Vth (M2) is negative and it can output a higher voltage by the threshold voltage Vth (M2).

As described above, the voltage clamp circuit 10 according to the first embodiment is configured that the first MOS transistor M1 outputs a constant current according to the power supply voltage Vdd and the second MOS transistor M2 outputs a voltage according to a voltage generated by the first and second diodes DI1, DI2. Therefore, while the power supply voltage Vdd is less than the predetermined value (20V), the voltage output from the MOS transistor linearly increases along with an increase in the power supply voltage Vdd. Because of this, the voltage clamp circuit 10 can output an arbitrary voltage needed to operate the supply voltage supervisor IC.

Also, while the power supply voltage Vdd is equal to or over the predetermined value, the first and second diodes DI1, DI2 turn on to make the output voltage Vout constant. Thus, the voltage clamp circuit 10 can be applied with a high voltage.

Moreover, setting the operating voltage limit (voltage at which bipolar operation starts) of the first and second MOS transistors M1, M2 to the predetermined value makes it possible for the voltage clamp circuit to be applied with about twice as large as the power supply voltage Vdd.

Further, since the first and second MOS transistors M1, M2 are n-channel, depletion type transistors and the second MOS transistor M2 is connected with the first MOS transistor M1 at the gate, a current supplied to the gate of the second MOS transistor M2 from the source of the first MOS transistor M1 is used only for operating the second MOS transistor M2 while the power supply voltage Vdd is below the predetermined value. Thus, amount of current consumption of the voltage clamp circuit is extremely low.

Even applied with the power supply voltage Vdd exceeding the predetermined value, the voltage clamp circuit 10 is configured that the supply voltage supervisor IC is operated by a current having passed through the second MOS transistor M2. Accordingly, amount of current consumption thereof can be very small.

The first and second MOS transistors M1, M2 and the first and second diodes DI1, DI2 are arranged on an SOI substrate to be completely separated from each other via the oxide film. Thus, there is no PN-junction among these elements and no well diffusion needed to separate the elements. This makes it possible to lay out a multi-stage circuit in a small area.

Further, the integrated circuit 100 incorporating such a voltage clamp circuit 10 can supply a voltage of an arbitrary value to operate the supply voltage supervisor IC while the power supply voltage Vdd is low and stably supply a voltage to normally operate the supply voltage supervisor IC while it is high.

Note that in the first embodiment the diffusion potential of the gate of the second MOS transistor M2 is set to the GND level. However, in a case where the earth potential of the substrate is unstable and exceeds a target bias voltage, the gate and source of the second MOS transistor M2 can be connected to stabilize the substrate potential as those of the first MOS transistor M1.

Further, in the first embodiment the first and second MOS transistors are n-channel, depletion type transistors, however, the present invention should not be limited to such an example. They can be n-channel, enhancement type transistors.

With use of the n-channel, enhancement type transistors, the voltage clamp circuit 10 can achieve the same effects that while the power supply voltage Vdd is the predetermined value or less, the output voltage Vout from the output terminal t2 linearly increases along with an increase in the power supply voltage Vdd, and when the power supply voltage Vdd exceeds the predetermined value, the output voltage Vout of the second MOS transistor M2 becomes constant irrespective of the increase in the power supply voltage Vdd.

Figure 4:
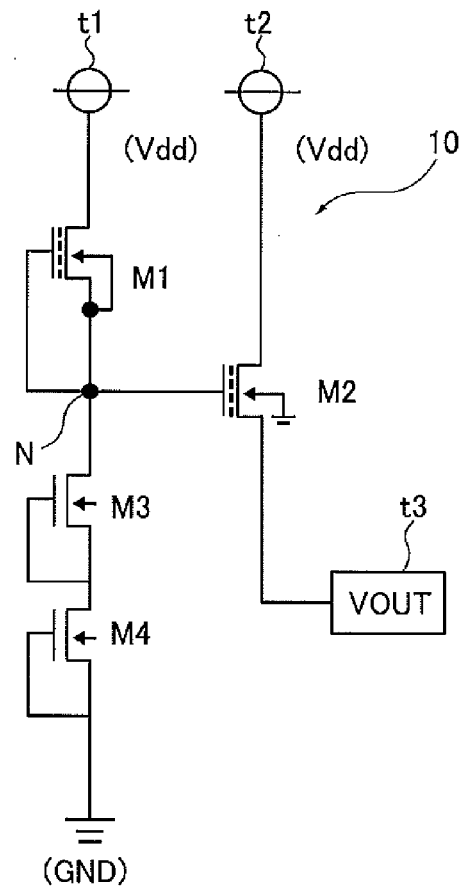
FIG. 4 shows the voltage clamp circuit according to the first embodiment which includes MOS transistors as a third element.

FIG. 4 is another example of the voltage clamp circuit 10 according to the first embodiment comprising MOS transistors as a third element instead of the first and second diodes DI1, DI2.

In FIG. 4 it comprises third and fourth MOS transistors M3, M4.

This voltage clamp circuit 10 is configured that the third and fourth MOS transistors allow a current to pass therethrough while the power supply voltage Vdd is a predetermined value (sum of threshold voltages Vth (M3), Vth (M4) of the third and fourth transistors M3, M4) or more.

Because of this, a current supplied to the second MOS transistor M2 from the first MOS transistor M1 becomes constant so that the output voltage Vout of the second MOS transistor M2 also becomes constant (Vth (M3)+Vth (M4)−Vth (M2)).

Second Embodiment

Next, an integrated circuit 200 according to a second embodiment of the present invention is described with reference to FIG. 5. The integrated circuit 200 according to the second embodiment comprises a voltage clamp circuit in two stages.

Figure 5:
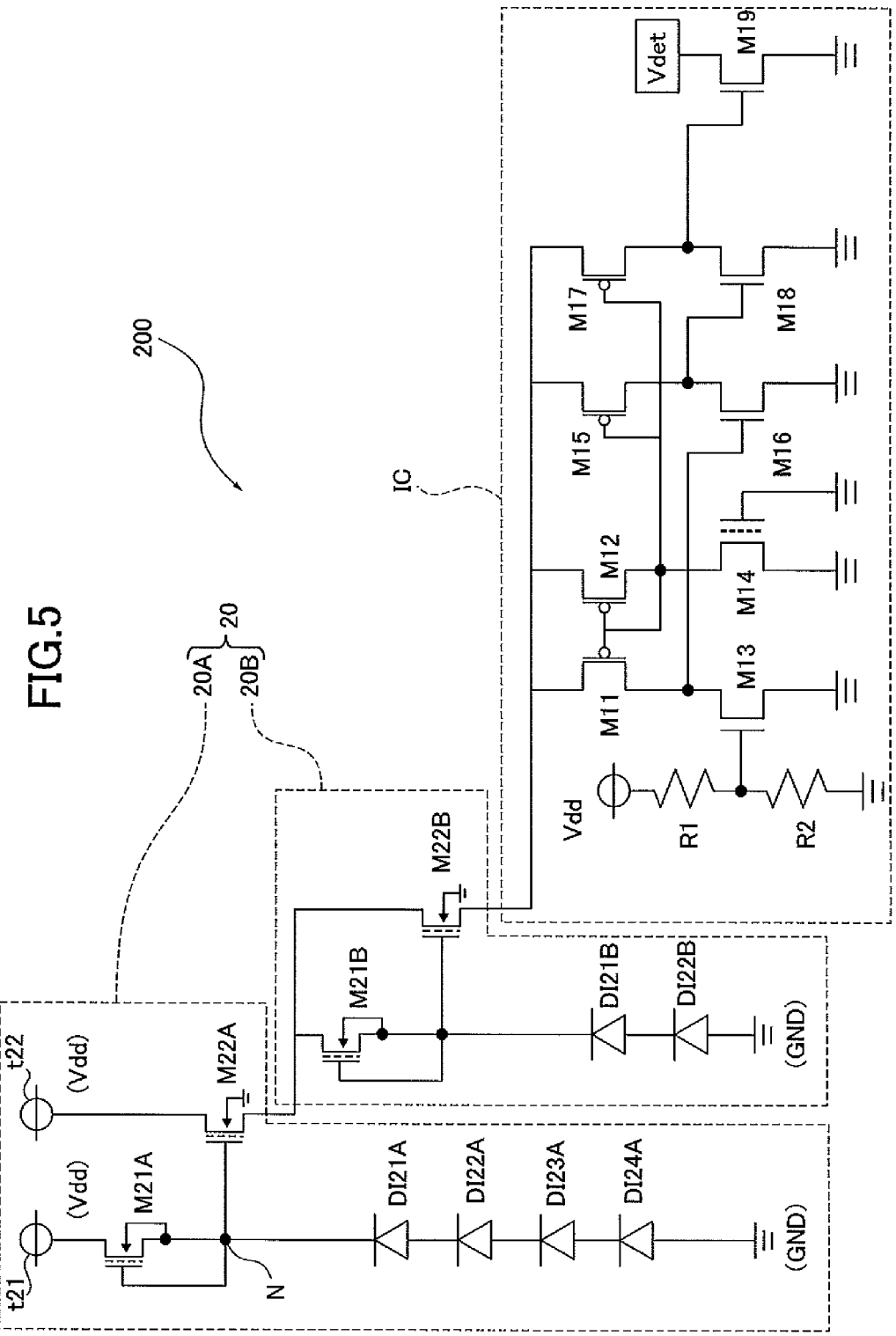
FIG. 5 shows an integrated circuit according to a second embodiment of the present invention.

FIG. 5 shows the integrated circuit 200 which comprises a voltage clamp circuit 20 and a supply voltage supervisor IC connected with the voltage clamp circuit 20.

The voltage clamp circuit 20 comprises a first circuit 20A (previous stage) and a second circuit 20B (subsequent stage).

In FIG. 5 the first circuit 20A comprises power supply terminals t21, t22 applied with the power supply voltage Vdd, a first MOS transistor M21A as a first element connected with the power supply terminal t21, and a second MOS transistor M22A as a second element connected with the power supply terminal t22.

The first circuit 20A further comprises first to fourth diodes DI21A to DI24A as a third element at downstream of the first MOS transistor M21A.

The breakdown voltages BV21A to BV24A of the four diodes DI21A to DI24A are set to the same value (10V).

The second circuit 20B comprises a first MOS transistor M21B as a first element, a second MOS transistor M22B as a second element, and first and second diodes DI21B, DI22B as a third element connected to downstream of the first MOS transistor 21B.

The first and second MOS transistors M21B, M22B of the second circuit 20B are connected to downstream of the second MOS transistor M22A of the first circuit 20A so that the output voltage from the first circuit 20A is to be an input voltage to the second circuit 20B.

The supply voltage supervisor IC is the same as that in the first embodiment shown in FIG. 2.

Next, operation of the voltage clamp circuit 20 according to the second embodiment is described.

While the power supply voltage Vdd is a predetermined value (sum of the breakdown voltages BV21A to BV24A (40V)) or less, a voltage supplied from the first circuit 20A to the second circuit 20B linearly increases along with an increase in the power supply voltage Vdd.

Along with the increase in the voltage supplied, the output voltage Vout from the second circuit 20B also linearly increases until the supplied voltage exceeds the sum of the breakdown voltages BV21B, BV22B of the second diode DI21B, DI22B.

The first and second diode DI21B, DI22B turn on when the voltage supplied to the second circuit 20B exceeds the sum (40V) of the breakdown voltages BV21B, BV22B of the second diode DI21B, DI22B, so that the output voltage Vout from the second circuit 20B becomes constant.

When the power supply voltage Vdd exceeds the predetermined value (40V), the output voltage of the second MOS transistor M22A of the first circuit 20A becomes constant irrespective of the increase in the power supply voltage Vdd.

The constant value is a value lower than the sum of the breakdown voltages BV21A to BV24A of the first to fourth diodes DI21A to DI24A by the threshold voltage Vth (M22) of the second MOS transistor M22A.

Similarly to the above, until the voltage supplied to the second circuit 20B exceeds the sum of the breakdown voltages BV21B, BV22B, the output voltage Vout from the second circuit 20B also linearly increases along with an increase in the supplied voltage. However, the output voltage Vout from the second circuit 20B becomes constant even when the supplied voltage exceeds the sum of the breakdown voltages BV21B, BV22B.

The voltage clamp circuit 20 according to the second embodiment can achieve the same effects as those of the voltage clamp circuit 10 in the first embodiment. In addition, it can be applied with about four times as large as the power supply voltage Vdd by setting the operation voltage limit of the first and second MOS transistors M21A, 22A of the first circuit 20A and the first and second MOS transistors M21B, M22B of the second circuit 20B to the predetermined value.

Third Embodiment

Next, an integrated circuit 300 according to a third embodiment is described with reference to FIG. 6. The integrated circuit 300 comprises a voltage clamp circuit in three stages.

Figure 6:
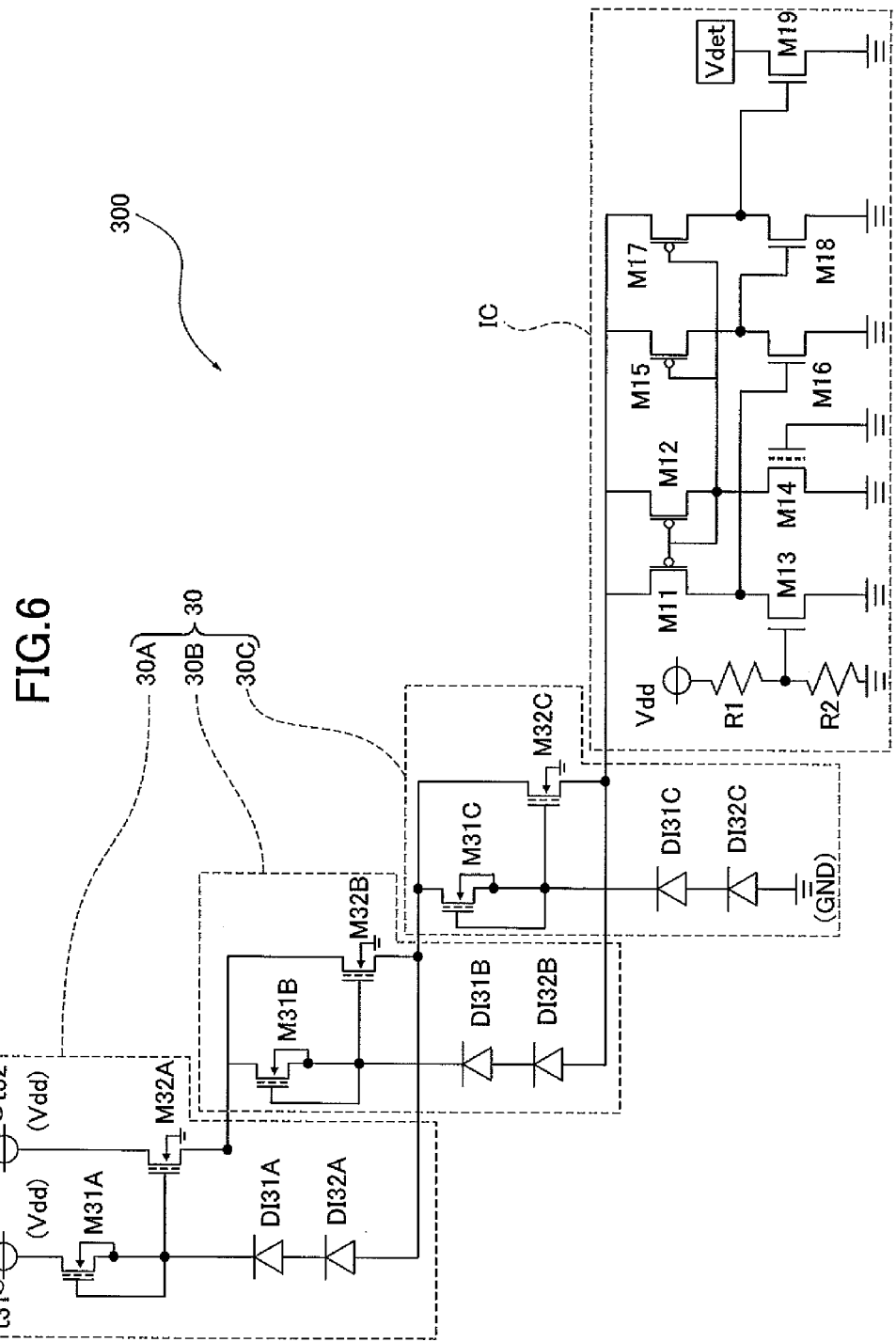
FIG. 6 shows an integrated circuit according to a third embodiment of the present invention.

In FIG. 6 the integrated circuit 300 comprises a voltage clamp circuit 30 and a supply voltage supervisor IC connected with the voltage clamp circuit 30.

The voltage clamp circuit 30 comprises a first circuit 30A, a second circuit 30B and a third circuit 30C.

As shown in FIG. 6, the first circuit 30A comprises power supply terminals t31, t32 applied with the power supply voltage Vdd, a first MOS transistor M31A as a first element connected with the power supply terminal t31, a second MOS transistor M32A as a second element connected with the power supply terminal t32, first and second diodes DI31A, DI32A as a third element connected to downstream of the first MOS transistor M31A.

The second circuit 30B comprises a first MOS transistor M31B as a first element, a second MOS transistor M32B as a second element, and first and second diodes DI31B, DI32B as a third element connected to downstream of the first MOS transistor 31B.

The third circuit 30C comprises a first MOS transistor M31C as a first element, a second MOS transistor M32C as a second element, and first and second diodes DI31C, DI32C as a third element connected to downstream of the first MOS transistor M31C.

The first and second MOS transistors M31B, M32B of the second circuit 30B are connected to downstream of the second MOS transistor M32A of the first circuit 30A so that the output voltage of the first circuit 30A is to be the input voltage to the second circuit 30B.

Similarly, the first and second MOS transistors M31C, M32C of the third circuit 30C are connected to downstream of the second MOS transistor M32B of the second circuit 30B so that the output voltage of the second circuit 30B is to be the input voltage to the third circuit 30C.

A downstream side of the second MOS transistor M32B of the second circuit 30B is connected with a downstream side of the second diode DI32A of the first circuit 30A while a downstream side of the second MOS transistor M32C of the third circuit 30C is connected to a downstream side of the second diode DI32B of the second circuit 30B.

Now, operation of the voltage clamp circuit 30 is described.

While the power supply voltage Vdd is a predetermined value (sum of the breakdown voltages BV31A, BV32A of the first and second diodes DI31A, DI32A of the first circuit 30A) or less, a voltage supplied to the second circuit 30B from the first circuit 30A linearly increases along with an increase in the power supply voltage Vdd.

Also, while a voltage input to the second circuit 30B is a predetermined value (sum of the breakdown voltages BV31B, BV32B of the first and second diodes DI31B, DI32B of the second circuit 30B) or less, a voltage supplied from the second circuit 30B to the third circuit 30C linearly increases along with an increase in the input voltage.

Likewise, while an input voltage to the third circuit 30C is a predetermined value (sum of the breakdown voltages BV31C, BV32C of the first and second diodes DI31C, DI32C of the third circuit 30C) or less, the output voltage Vout from the third circuit 30C linearly increases along with an increase in the input voltage.

Meanwhile, when the power supply voltage Vdd exceeds the predetermined value, the first and second diodes DI31A, DI32A turn on so that the voltage from the first circuit 30A to the second circuit 30B becomes constant.

When the voltage supplied to the second circuit 30B exceeds the predetermined value (sum of the breakdown voltages BV31B, BV32B), the first and second diodes DI31B, DI32B turn on so that the voltage at downstream of the second MOS transistor M32B of the second circuit 30B becomes constant.

Then, a current having passed through the first and second diodes DI31B, DI32B flows into the third circuit 30C. The voltages in sum of the downstream of the second MOS transistor M32B of the second circuit 30B and the downstream of the second diode DI32A of the first circuit 30A are input to the third circuit 30C.

When the input voltage to the third circuit 30C exceeds the predetermined value (sum of the breakdown voltages BV31C, BV32C), the first and second diodes DI31C, DI32C turn on so that the output voltage Vout of the third circuit 30C becomes constant.

Thus, the voltage clamp circuit 30 according to the third embodiment can achieve the same effects as those of the voltage clamp circuit 10 in the first embodiment. In addition, it can be applied with about six times as large as the power supply voltage Vdd by setting the operation voltage limit of all the first and second MOS transistors M31A, 32A, M31B, M32B, M31C, and M32C of the first to third circuits 30A to 30C to the predetermined value.

Moreover, the voltage clamp circuit 30 is configured that the downstream side of the second MOS transistor M32B of the second circuit 30B is connected with the downstream side of the second diode DI32A of the first circuit 30A as well as the downstream side of the second MOS transistor M32C of the third circuit 30C is connected with the downstream side of the second diode DI32B of the second circuit 30B. Accordingly, the current having passed through the diodes of the circuit in the preceding stage can be used for operating the circuit in the succeeding stage, enabling a reduction in the current consumption.

The third embodiment has described an example that the voltage clamp circuit is configured in three stages. However, the voltage clamp circuit according to the present invention should not be limited to such an example. It can be configured in two or more stages.

The voltage clamp circuit according to any of the above embodiments can output an arbitrary voltage required to operate a device in connection since an output voltage from the second element linearly increases along with an increase in the power supply voltage as long as the power supply voltage is below the predetermined value.

Also, when the power supply voltage is or exceeds the predetermined value, the voltage clamp circuit is configured that a voltage generated by the first and third elements passes through the third element, becomes constant and is output to the second element. Accordingly, the second element can output a constant voltage. Thus, the voltage clamp circuit can output a voltage suitable to normally operate a device in connection, even applied with an input voltage equal to or over the predetermined value.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. A voltage clamp circuit configured to output an output voltage a power supply to an integrated circuit, the voltage clamp u comprising:
    a power supply terminal;
    a first element connected to an intermediate node and connected to the power supply terminal to receive a power supply voltage as an input voltage, the first element including an n-channel, depletion type transistor, a gate and a source of the n-channel, depletion type transistor of the first element being connected to each other to output a constant current to the intermediate node;
    one or more diode elements, wherein a cathode of a first diode element amongst the one or ore diode elements is connected to the intermediate node and an anode of a last diode element amongst the one or more diode elements is connected to a ground node, the one or more diode elements being configured to allow a current to pass from the cathode of the first diode element through each of the one or more diode elements to the anode of the last diode element when the power supply voltage exceeds a predetermined value; and
    a second element including an n-channel, depletion type MOS transistor having a drain connected to the power supply terminal, a source connected to an output node, and a gate connected to the intermediate node, the second element being configured to output an output voltage to the output node unconnected to the one or more diode elements according to the voltage of the intermediate node,
    wherein a gate of the n-channel, depletion type transistor of the second element is connected to a source of the n-channel, depletion type transistor of the first element.

2. The voltage clamp circuit according to claim 1, wherein the first element and second element are disposed on an SOI substrate to be completely separated from each other via an oxide film.

3. An integrated circuit comprising the voltage clamp circuit according to claim 1, to operate using an output voltage of the voltage clamp circuit as a power supply.

4. The voltage clamp circuit according to claim 1, wherein in a case that the power supply voltage exceeds the predetermined value, the output voltage equals a threshold voltage of the second element subtracted from a breakdown voltage of the one or more diode elements.

5. The voltage clamp circuit according to claim 1, wherein in a case that the power supply voltage is less than the predetermined value, the output voltage linearly increases along with an increase in the power supply voltage.

6. The voltage chimp Circuit according to claim 1, wherein the intermediate node is only connected to the first element and second element.

7. The voltage clamp circuit according to claim 1, wherein the second element is unconnected to the ground node.

8. A multi-stage circuit including plural voltage clamp circuits in series, wherein an output voltage from a preceding stage is provided as a power supply voltage as an input voltage to a succeeding stage, and wherein each one of the plural voltage clamp circuits comprises:
a power supply terminal;
a first element connected to an intermediate node and connected to the power supply terminal to receive a power supply voltage as an input voltage, the first element including an n-channel, depletion type transistor, a gate and a source of the n-channel, depletion type transistor of the first element being connected to each other to output a constant current to the intermediate node;
one or more diode elements, wherein a cathode of a first diode element amongst the one or more diode elements is connected to the intermediate node and an anode of a last diode element amongst the one or more diode elements is connected to a ground node, the one or more diode elements being configured to allow a current to pass from the cathode of the first diode element through each of the one or more diode elements to the anode of the last diode element when the power supply voltage exceeds a predetermined value; and
a second element including an n-channel, depletion type MOS transistor having a drain connected to the power supply terminal, a source connected to an output node, and a gate connected to the intermediate node, the second element configured to output an output voltage to the output node unconnected to the one or more diode elements according to the voltage of the intermediate node,
wherein a gate of the n-channel, depletion type transistor of the second element is connected to a source of the n-channel, depletion type transistor of the first element.

9. A multi-stage circuit including plural voltage clamp circuits in series, wherein an output voltage from a preceding stage is to be an input voltage to a succeeding stage and wherein each one of the plural voltage clamp circuits comprises:
a power supply terminal;
a first element connected to an intermediate node and connected to the power supply terminal to receive a power supply voltage as an input voltage, the first element including an n-channel, depletion type transistor, a gate and a source of the n-channel, depletion type transistor of the first element being connected to each other to output a constant current to the intermediate node;
one or more diode elements, wherein a cathode of a first diode element amongst the one or more diode elements is connected to the intermediate node and an anode of a last diode element amongst the one or more diode elements is connected to a ground node, the one or more diode elements being configured to allow a current to pass from the cathode of the first diode element through each of the one or more diode elements to the anode of the last diode element when the power supply voltage exceeds a predetermined value; and
a second element including an n-channel, depletion type MOS transistor having drain connected to the power supply terminal a source connected to an output node, and a gate connected to the intermediate node, the second element being configured to output an output voltage to the output node unconnected to the one or more diode elements according to the voltage of the intermediate node,
wherein a gate of n-channel, depletion type transistor of the second element is connected to a source of the n-channel, depletion type transistor of the first element, and
wherein a downstream side of the second element in the succeeding stage is connected to a downstream side of the one or more diode elements n the preceding stage.

* * * * *